United States Patent [19]
Marshall

[11] Patent Number: 5,162,827
[45] Date of Patent: Nov. 10, 1992

[54] ONE PIECE TRANSPARENCY MOUNT WITH SPRING TRANSPARENCY RESTRAINT

[76] Inventor: Leonard Marshall, 1700 MacDonnell Dr., Palm Harbor, Fla. 34684

[21] Appl. No.: 748,419

[22] Filed: Aug. 22, 1991

Related U.S. Application Data

[63] Continuation-in-part of Ser. No. 590,780, Oct. 1, 1990.

[51] Int. Cl.[5] .................................................. G03B 21/64
[52] U.S. Cl. ....................................... 353/120; 40/156; 40/159.2; 40/152
[58] Field of Search .................... 353/120, DIG. 5; 40/159.2, 159, 158.1, 156, 152, 154; 206/451, 455, 456

[56] References Cited

U.S. PATENT DOCUMENTS

| | | | |
|---|---|---|---|
| 2,931,118 | 4/1960 | Riedel | 40/152 |
| 3,035,364 | 5/1962 | Hoogesteger | 40/152 |
| 3,090,145 | 5/1963 | Goyke | 40/152 |
| 3,478,456 | 11/1969 | Mundt et al. | 40/152 |
| 4,607,442 | 8/1986 | Desmarais et al. | 40/159 |
| 4,685,785 | 8/1987 | Mundt et al. | 353/120 |

FOREIGN PATENT DOCUMENTS 0882902  6/1943  France .................... 40/152

*Primary Examiner*—Allan N. Shoap
*Assistant Examiner*—William C. Dowling

[57] ABSTRACT

A slide mount has a frame defining a transparency receiving cavity and a transparency inlet for inserting a transparency into the transparency cavity. A spring capable of imparting a compressive spring force in the transparency receiving cavity is connected to the frame away from the transparency inlet. The spring engages a transparency inserted into the transparency receiving cavity to retain the transparency in the cavity by a compressive spring force.

10 Claims, 1 Drawing Sheet

ONE PIECE TRANSPARENCY MOUNT WITH SPRING TRANSPARENCY RESTRAINT

CROSS-REFERENCE

This application is a continuation-in-part of U.S. patent application Ser. No. 590,780, filed Oct. 1, 1990.

BACKGROUND OF THE INVENTION

1. Technical Field

The present invention is directed toward photographic equipment and more particularly to a slide mount for holding a transparency for use with a projector.

2. Background Art

Slide mounts are well known in the art and generally involve one of several configurations. The most well known slide mount comprises two pieces of cardboard with a central aperture therein. The pieces of cardboard are bound together about their periphery by an adhesive. A transparency is secured intermediate the pieces of cardboard with its image in the central aperture. These mounts have several problems. First, they are subject to warping when exposed to moisture or humid conditions. Second, the transparency is tightly secured to the cardboard frames with no freedom of movement. As a result, when the transparency is exposed to heat, such as when viewed through a projector, the transparency expands causing it to warp or buckle in the central aperture, thereby distorting the projected image. In addition, the transparency may be removed only by cutting or tearing the mount, which not only destroys the mount, but exposes the transparency to potential damage.

A second group of slide mounts generally comprise two plastic or metal frame portions with a central aperture therein fastened together about their periphery by complimentary grooves and ridges. Alternatively, the frame portions are fastened by a tongue and groove configuration. These mounts also include two panes of glass secured by the frame covering the central aperture for containing a transparency between. These mounts also have several serious problems. First, the glass in the central aperture makes the mounts heavy. In addition, the glass may be broken during insertion of a transparency or if dropped in a dark room during a slide presentation, creating a potential hazard. Transparencies are also difficult to load into these mounts. Finally, because the mounts require glass panes and precisely fitting frame pieces, they are difficult and expensive to manufacture.

A third group of slide mounts generally comprises two plastic or metal frame portions with a central aperture therein which snap together or are slidably engaged about the periphery of the frame. As with the other prior art slide mounts, these slide mounts have major drawbacks. Because they must either snap or slide together, the frames must be precisely machined, increasing the cost and creating quality control problems in manufacture. Loading and aligning film within such frames is difficult and time consuming because the grooves and ridges which snap together or the tongue and grooves which slide together must be carefully aligned without misaligning the image on the transparency. Lastly, it may be difficult to separate the frames when changing transparencies.

Another group of slide mounts generally comprise two frame portions with central apertures therein joined at one edge by an integral hinge. The two frame portions are fastened together by cooperating groove and ridge structures. These mounts have the disadvantages of being difficult and expensive to manufacture and difficult to insert and remove transparencies from.

Yet another group of prior art slide mounts generally involve two frame portions with a central aperture therein defining inner edges of the mount. The frame portions are bound together about three of the four outer edges of the frame portions by an adhesive or by sonic welding. A film receiving cavity is formed between the frame pieces and comprises an elongated narrow passage extending from the unbound outer edge to the corresponding inner edge of the frame portions and grooves in the remaining inner edges of the frame portions. A transparency may be inserted into the frame by sliding it through the opening in the frame and into the grooves in the inside edges of the frame. Although an advancement over other prior art structures, such mounts have several problems. First, manufacture is expensive because the two frame pieces must be fastened together. In addition, inserting the bottom edge of a transparency in the slot in the inside bottom edge of such mount is difficult. Moreover, when the two frames are mounted together it has proven difficult to properly dimension the chamber. Thus, sometimes the cavity is too tight to receive a transparency and other times it is so loose that a transparency may fall out. A related problem is that these slide mounts are not adapted to receive transparencies of varying thicknesses. Thus, if the slots are configured to receive a thick transparency then thin transparencies can easily slide out of the mount. Conversely, if the slots are configured to receive a thin transparency, insertion of a thick transparency can be difficult or impossible.

One prior art structure, Netherlands Patent No. 162,399 to Geim, shows a slide mount with a spring activated closure. Specifically, Geim discloses a slide mount having two frame portions including a back frame portion and a front frame portion. The front frame portion is received within the back frame portion and attached thereto except along one side and a portion of the sides adjacent the one side which define an access panel to a transparency receiving cavity. The frame is made of a resilient material which normally biases the access panel in a closed position. A transparency may be inserted into the frame by pulling up on the access panel at the one side and forcing it into an open position and then sliding the transparency under the access panel. Upon releasing the access panel, it returns to the closed position substantially blocking access to the slide receiving cavity and trapping a transparency inserted therein. Geim has the advantage over much of the prior art in that it is able to accommodate transparencies of varying thicknesses. However, Geim has several serious problems. First, it can be difficult to pull up on the access panel so that a transparency may be inserted thereunder. Indeed, persons with limited dexterity may find it impossible. Second, Geim is a two piece construction which increases its cost. Third, because the access panel is at the slide receiving cavity inlet, if it is not pulled up enough during transparency insertion it will rub on and scratch the transparency, potentially ruining prized photographs.

The present invention is directed toward overcoming one or more of the problems discussed above.

SUMMARY OF THE INVENTION

An object of the invention is providing a slide mount which is easy and inexpensive to manufacture.

A further object of the present invention is providing a slide mount with a transparency receiving cavity having sufficient play around the periphery of the transparency that the transparency may expand when subjected to heat as opposed to bending or warping.

A further object of the present invention is providing a slide mount into which a transparency may be quickly and easily inserted and removed.

A further object of the present invention is to provide a slide mount which securely maintains a transparency therein yet which allows the transparency to be readily removed under manipulation by a user.

Yet another object of the present invention is to provide a slide mount capable of receiving transparencies of varying thicknesses that will not scratch or otherwise damage an image carried on a transparency.

In one aspect of the present invention a slide mount for slidably receiving a transparency carrying an image thereon for projection by a projector comprises an integrally formed frame having a front wall, a back wall, a top edge, a bottom edge and two side edges, the bottom edge and the two side edges connecting the walls together. A central aperture in the frame, through which an image carried by the transparency may be viewed, extends through the front and back walls of the frame. The aperture defines an inner top edge and inner bottom edge and two inner side edges of the frame. The frame has a cavity for slidably receiving a transparency. The cavity is formed by a passage extending from the top edge to the inner top edge of the frame and by slots in the inner bottom edge and the two inner side edges of the frame, the slots and the passage forming a cavity of a height, width and depth slightly greater than that of the transparency. A guide is provided for guiding the bottom edge of the transparency into the slot in the inner bottom edge of the frame.

In another aspect of the present invention, the above-described slide mount has at least one ridge disposed within a slot in the inner edges of the frame for retaining the transparency within the frame.

In another aspect of the present invention, the above-described slide mount has a notch in the upper edge of the frame between the front of the frame and the passage extending from the top edge to the inner top edge of the frame for facilitating the insertion of a transparency into the frame.

In yet another aspect of the present invention, a slide mount has a frame defining a transparency receiving cavity and a transparency inlet for inserting a transparency into the transparency receiving cavity. A spring capable of imparting a compressive spring force in the transparency receiving cavity is connected to the frame away from the transparency inlet. The spring engages a transparency inserted into the transparency receiving cavity to retain the transparency in the cavity by a compressive spring force. A ridge may be operatively associated with the spring such that when a transparency is inserted into the transparency receiving cavity, a compressive spring force is applied to the ridge and the transparency. The spring can be integrally formed with the frame. Preferably, the spring is formed by at least one portion of the frame which defines an "L" shaped slit in one of the front or the back of the frame, the slit extending from one of the front and the back of the frame to the transparency receiving cavity.

Other objects, advantages and features of the present invention will become apparent from a consideration of the following specification taken in conjunction with the accompanying drawings.

DETAILED DESCRIPTION OF THE PREFERRED EMBODIMENT

Figure 6:
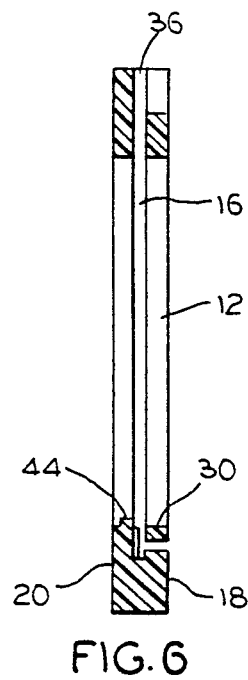
FIG. 6 is a cross sectional view taken along line 6—6 of FIG. 1.
Figure 2:
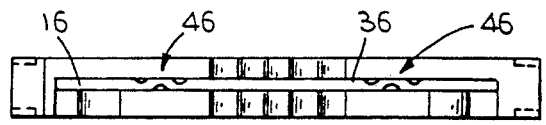
FIG. 2 is a top view of the slide mount of the present invention.
Figure 1:
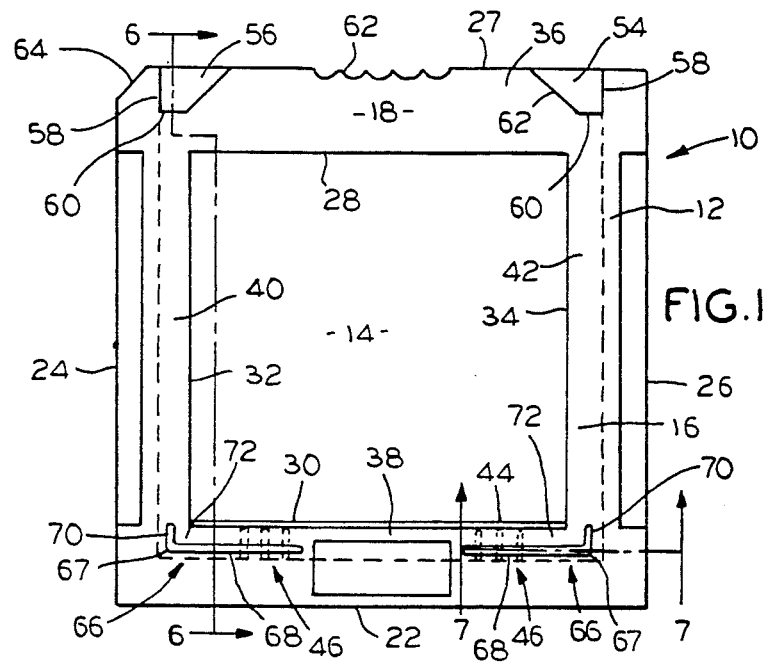
FIG. 1 is a front plan view of the slide mount of the present invention.
Figure 5:
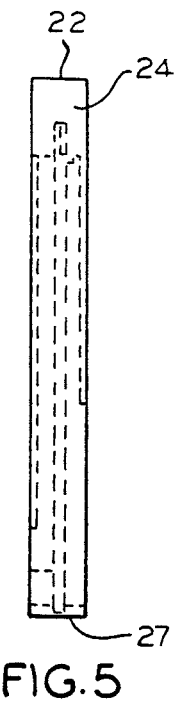
FIG. 5 is a side view of the slide mount of the present invention depicted in FIG. 3.
Figure 3:
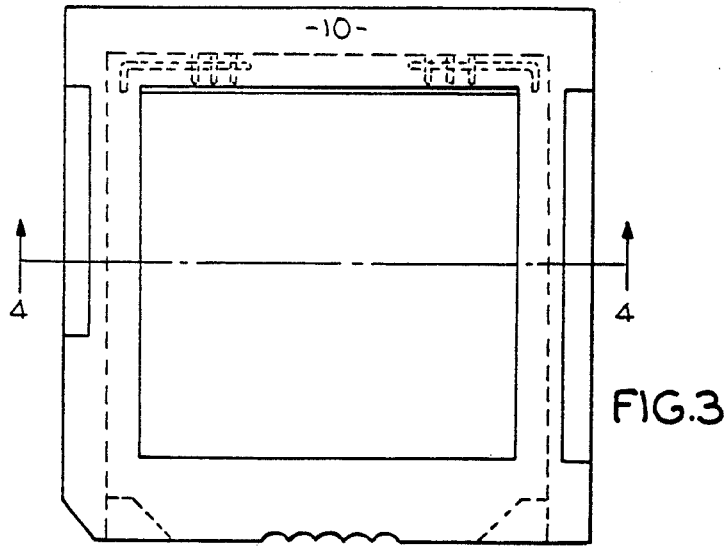
FIG. 3 is a back plan view of the slide mount of the present invention, the slide mount being aligned upside down from the view in FIG. 1.

The slide mount 10 of the present invention is illustrated in FIG. 1. The slide mount 10 comprises an integrally formed frame 12 having a central aperture 14 therein and a transparency receiving cavity 16. The transparency receiving cavity 16 is best seen in FIGS. 2 and 6. The integrally formed frame 12 is formed of a resilient plastic material, preferably a molded polystyrene Referring again to FIG. 1, the frame 12 comprises a front wall 18 and, as seen in FIG. 3, a back wall 20. As seen in FIG. 1, the front wall 18 and the back wall 20 are joined together by a bottom edge 22, opposite side edges 24 (see FIG. 5), 26 and a top edge 27.

FIG. 1 illustrates that the aperture 14 through the frame 12 defines an inner top edge 28 and inner bottom edge 30 and two inner side edges 32, 34. Preferably, the aperture 14 is of a dimension equal to or larger than an image carried by a transparency to be mounted within the slide mount 10.

As seen in FIGS. 1 and 2 the transparency receiving cavity 16 is defined within the frame 12 by an elongated narrow passage 36 extending from the top edge 27 to the inner top edge 28. The transparency receiving cavity 16 is further defined by a slot 38 in the inner bottom edge 30 of frame 12 and slots 40 and 42 in the inner side edges 32, 34 of the frame 12.

The passage 36 should be of a depth and width slightly greater than that of a transparency received therein. Referring to FIG. 1, the slots 40, 42 in the inner side edges 32, 34 should be of a length slightly greater than that of the transparency.

A guide 44 is integrally formed in the lower inner edge 30 of the frame 12. The guide 44 comprises a portion of the back wall 20 which extends above the front wall 18 at the inner bottom edge 30 of the frame 12 (see FIG. 6).

Figure 4:
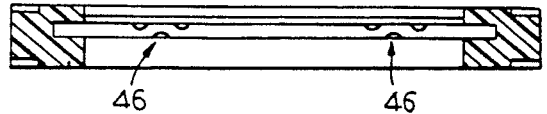
FIG. 4 is a cross sectional view taken along line 4—4 of FIG. 3.
Figure 7:
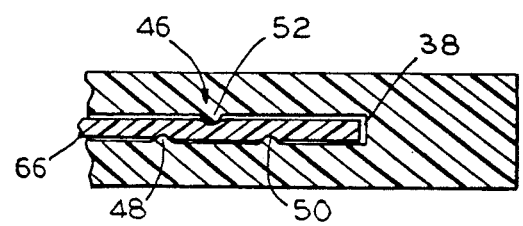
FIG. 7 is a cross sectional view taken along line 7—7 of FIG. 1 showing a transparency within the slide mount.

As seen in FIGS. 2, 4 and 7 a plurality of ridges 46 for retaining a transparency within the transparency receiving cavity 16 are disposed within the transparency receiving cavity 16. Preferably, the ridges are integrally formed in the portion of the frame 12 defining the slot 38 in the inner bottom edge 30 of the frame 12. As most clearly illustrated in FIG. 7, in the preferred embodiment, the ridges 46 are disposed such that two ridges 48, 50 extend from one wall of the slot 38 with a third ridge 52 extending from the opposing wall of the slot 38 intermediate the ridges 48, 50.

Referring to FIG. 1, a pair of notches 54 and 56 are in the top edge 27 of the frame 12. The notches 54 and 56 extend between the front wall 18 of the frame 12 and the passage 36. The notches 54, 56 have a first side 58 which descends perpendicularly from the top edge 27 of the frame 12 proximate the side edges 24, 26 of the frame 12. A second side 60 forms a flat bottom portion. A third side 62 extends from the flat bottom portion 60 generally towards the center of the top edge 27.

A plurality of grooves 62 for facilitating alignment of the frame for insertion into a slide projector are disposed upon the top edge 27 of the frame 12. As is readily apparent to one skilled in the art, the grooves 62 may be disposed upon any edge of the frame 12 for the same purpose.

A cut 64, also for facilitating alignment of the frame for insertion into a slide projector, joins the side edge 24 and the top edge 27. Those skilled in the art will realize the cut 64 may join any two adjacent sides of the frame 12 for the same purposes.

As appreciated by those skilled in the art of plastic injection molding, the slide mount 10 is formed from a mold having two halves with a blade for forming the cavity 16 disposed intermediate thereof. After injection, the plastic is cooled and the mold is opened and the blade withdrawn.

Using the slide mount 10 a transparency (not shown) may be quickly slidably inserted within the transparency receiving cavity 16 and secured therein by the ridges 46. Specifically, a lower corner of the transparency is fed into the notch 54 or 56 and the lower portion of its sides are aligned within the slots 40 and 42 in the inner edge 32 and 34 of the frame 10. The transparency is then slidably inserted in the transparency receiving cavity 16.

When the bottom edge of the transparency reaches the inner bottom edge 30 of the frame 10 it may readily be inserted into the slot 38 in the inner bottom edge 30 by means of the guide 44. More particularly, the back of the lower portion of the transparency may be pressed against the guide 44 (i.e. the portion of the back wall 20 extending above the front wall 18 at the inner bottom edge 30, see FIG. 6), thus aligning the bottom edge of the transparency with the slot 38 in the inner bottom edge 30. Upon alignment, the transparency may then be inserted over the ridges 46, thus securing the transparency within the slide mount 10. When finally inserted in the transparency receiving chamber 16, the bottom edge of the transparency is flush against the bottom of the slot 38 in the inner bottom edge 30, thereby properly aligning any image carried upon the transparency within the aperture 14.

As readily understood by those skilled in the art and as seen in FIG. 7, the ridges 48, 50 and 52 function to secure the transparency 66 within the transparency receiving cavity 16 by deforming the lower portion of the transparency 66 between the opposing ridges 48, 50 and 52.

Once a transparency is disposed within the transparency receiving chamber 16, it may readily be removed by grasping the transparency through the aperture 14 and slidably disengaging the lower portion of the transparency from the ridges 46 and removing the transparency from the slide mount 10. Of course, the slide mount 10 may be reused time and again to hold other transparencies. In addition, provided the depth of the transparency receiving chamber 16 is great enough, more than one transparency may readily be inserted into the chamber 16 to superimpose images.

The slide mount 10 containing a transparency may be quickly aligned for projection by a projector by means of the grooves 62 and the cut 64. An operator needs no light to visually align the slide mount 10; rather he need only to run his fingers over the grooves 62 and the cut 64 to properly align the slide mount 10 for insertion into a projector.

The dimensions of the transparency receiving chamber are slightly greater than that of the transparency to be received therein. Obviously, the height and width of the transparency receiving chamber 16 is dependent upon the height and width of the transparency to be disposed therein. In any event, however, a 0.010 to 0.020 in. tolerance should be allowed with respect to the width of the transparency to permit the transparency to expand when heated, as for example when shown through a projector, without buckling or warping. Similarly, the depth of the transparency receiving chamber 16 (i.e. the depth of the passage 36 and the slots 38, 40, 42) should be slightly greater than the depth of the transparency received therein For example, with regular slide film a depth of 0.005 in. is acceptable; with a cut sheet film a depth of 0.0095 in. is acceptable; with black and white roll films for titles a depth of 0.0038 in. is acceptable; with white mat plastic for titles a depth of 0.0075 in. is acceptable.

In a highly preferred embodiment, the slide mount 10 has a pair of spring grippers 66 made from two "L" shaped slits 67 at the bottom of the front wall 18. The L-shaped slits 67 have a stem portion 68 and a foot portion 70. The stem portion 68 extends horizontally along the front wall 18 and the foot portion 70 extends vertically along the front wall 18. The L-shaped slit 67 passes all the way through the front wall 18 into the transparency receiving cavity 16. More particularly, the L-shaped slit 67 extends into the slot 38. In the preferred embodiment, each foot 70 extends into the slots 40,42 in the inner side edges 32,34. A gripper panel 72 is formed above the stem portion of the L-shaped slit 67 and defined by the L-shaped slit 67. The ridges 46 are located between the stem portion 68 of the L-shaped slit 67 and the inner bottom edge 30 of the frame 12.

While the spring gripper 66 disclosed herein is formed by an L-shaped slit 67, those skilled in the art will realize that the L-shaped slit 67 could have other nonlinear configurations such as a C-shape and still be effective in forming the spring gripper 66. The key attribute of the slit shape is that the slit 67 define a gripper panel 72 in the frame 12 which can be displaced from the frame portion 12 yet capable of exerting a resilient compressive force urging the gripper panel 72 to return to a normal position flush with the front wall 18.

When a transparency is inserted into a slide mount having the spring grippers 66, the transparency is forcibly inserted into the slot 38 in the inner bottom edge 30, thereby engaging the ridges 46. The transparency causes the gripper panels 72 to deflect outward from a normal position flush with the front wall 18 of the frame 12. However, because of the resilient nature of the plastic material from which the frame 12 is integrally formed, the gripper panels 72 of the frame 12 acts in a spring-like manner to impart a compressive spring force on the transparency as the gripper panel 72 is urged to its normal position, thereby securing the transparency within the transparency receiving cavity 16. Because the gripper panel 72 of the frame 12 can deflect outward when a transparency is inserted over the ridges 46, the slide mount 10 can accommodate transparencies having a thickness of at least about 0.003 to about 0.010 inches. The depth of the transparency receiving chamber 16 of a slide mount 12 having the spring gripper 66 should be at least 0.010 inches to accommodate transparencies of varying thicknesses.

As is readily apparent from the detailed description, the slide mount disclosed herein may be quickly and inexpensively formed in a single molding operation. A transparency may be easily inserted within the slide mount by virtue of the notch in the upper edge of the slide mount and quickly fed into the bottom slot of the transparency receiving cavity by the guide formed at the inner bottom edge of the aperture. The transparency may be readily secured within the slide mount by virtue of the ridges in the slide receiving grooves. The slide mount is readily reusable. In addition, images carried by the transparency inserted within the slide mount are readily and immediately aligned within the slide mount when the bottom edge of the transparency firmly abuts the bottom of the transparency receiving cavity. Moreover, the slide mount having the spring gripper can accommodate transparencies of varying thicknesses. This feature has the obvious advantage that users need only buy a single size slide mount to accommodate transparencies of varying thicknesses. Also, merchants need only carry a single size slide mount to accommodate customers' needs to mount transparencies of varying thicknesses. The location of the spring gripper is below an image carrying portion of a transparency, assuring that the image of a transparency mounted in the slide mount will not be scratched or otherwise damaged by the action of the spring gripper.

Still other aspects, objects and advantages of the present invention can be obtained from a study of the specification, the drawings and the appended claims.

I claim:

1. A slide mount for slidably receiving a transparency therein, the slide mount comprising:
    an integrally formed frame having a front wall, a back wall, a top edge and a bottom edge and side edges between the top and the bottom edge, the bottom and side edges connecting the walls;
    a central aperture in the frame through which an image carried by a transparency can be viewed, the aperture extending through the front wall and the back wall of the frame, the aperture defining an inner top edge, an inner bottom edge and two inner side edges of the frame;
    a cavity in the frame for slidably receiving the transparency, the cavity being formed by a transparency inlet extending from the top edge to the inner top edge of the frame and by slots in the inner bottom edge and the inner side edges of the frame, the slots and the passage forming a cavity of a height, width and depth slightly greater than that of the transparency; and
    a spring capable of imparting a compressive spring force in the transparency receiving cavity connected to the frame away from the inlet, the spring engaging a transparency inserted into the slide receiving cavity to retain the transparency in the cavity by a compressive spring force.

2. The slide mount of claim 1 further including means for guiding the bottom edge of the transparency into the slot in the inner bottom edge of the frame.

3. The slide mount of claim 1 further including a ridge in the transparency receiving cavity for engaging a transparency in the cavity, the ridge being operatively associated with the spring such that a when a transparency is inserted into the transparency receiving cavity a compressive spring force is applied to the ridge and the transparency.

4. The slide mount of claim 3 having a plurality of ridges extending from opposite sides of a portion of the frame defining the slide receiving cavity, at least one of the ridges being operatively associated with the spring.

5. The slide mount of claim 4 wherein the spring is integrally formed with the frame.

6. The slide mount of claim 5 wherein the spring is formed by at least one portion of the frame defining a nonlinear slit in one of the front wall and the back wall of the frame, the slit extending from one of the front wall and back wall of the frame to the transparency receiving cavity, the slit in turn defining a spring panel.

7. The slide mount of claim 6 wherein the nonlinear slit is L-shaped.

8. The slide mount of claim 2 wherein the means for guiding the bottom edge of the transparency comprises a portion of the back wall of the frame which extends above the front wall of the frame at the inner bottom edge of the frame.

9. The slide mount of claim 1 wherein a notch is in the top edge of the frame between the front wall of the frame and the passage extending from the top edge to the inner top edge of the frame for facilitating insertion of a transparency into the frame.

10. The slide mount of claim 1 wherein a groove is on one edge of the frame for facilitating alignment of the frame for insertion into a slide projector.

* * * * *